United States Patent
Rasmusson et al.

(10) Patent No.: US 8,031,937 B2
(45) Date of Patent: Oct. 4, 2011

(54) FRAME BUFFER COMPRESSION AND DECOMPRESSION METHOD FOR GRAPHICS RENDERING

(75) Inventors: Jim Rasmusson, Vellinge (SE); Tomas Akenine-Möller, Lund (SE); Jon Hasselgren, Bunkeflostrand (SE); Jacob Munkberg, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 966 days.

(21) Appl. No.: 11/953,339

(22) Filed: Dec. 10, 2007

(65) Prior Publication Data
US 2008/0247641 A1   Oct. 9, 2008

Related U.S. Application Data

(60) Provisional application No. 60/910,112, filed on Apr. 4, 2007.

(51) Int. Cl.
*G06K 9/00* (2006.01)
*G06T 17/00* (2006.01)
*G06K 9/36* (2006.01)

(52) U.S. Cl. .................................. 382/166; 345/420

(58) Field of Classification Search .......... 382/162, 382/164, 166, 168, 173, 232, 236–238, 244–246, 382/274, 305; 345/418–420, 555, 582, 612, 345/613; 375/240.24, 240.27, 355; 348/111, 348/169, 672; 701/213
See application file for complete search history.

(56) References Cited

U.S. PATENT DOCUMENTS

| | | | | |
|---|---|---|---|---|
| 4,364,089 A | * | 12/1982 | Woolfson | 348/169 |
| 5,191,406 A | | 3/1993 | Brandestini et al. | |
| 5,416,787 A | * | 5/1995 | Kodama et al. | 714/790 |
| 5,886,701 A | | 3/1999 | Chauvin et al. | |

(Continued)

FOREIGN PATENT DOCUMENTS
GB   2339989 A   2/2000

OTHER PUBLICATIONS

Hasselgren, J. et al. "Efficient Depth Buffer Compression." Proceedings of the 21st ACM SIGGRAPH, 2006, pp. 103-110. Available at: http://graphics.cs.lth.se/research/papers/depth2006/dbc.pdf.

(Continued)

*Primary Examiner* — Amir Alavi
(74) *Attorney, Agent, or Firm* — Coats & Bennett, P.L.L.C.

(57) ABSTRACT

Methods and apparatus are disclosed for the processing of frame buffer data, such as color buffer data, in graphics processing applications. Although more generally applicable, these methods and apparatus are particularly useful in real-time, polygon-based, 3D rendering applications. An exemplary method for processing graphics data according to one or more embodiments of the invention begins with the retrieval, from a buffer, of pixel values corresponding to a tile of two or more pixels, and with the updating of one or more of those updated pixel values. The updated pixel values are selectively compressed using a lossy compression operation or a lossless compression operation, based on an accumulated error metric value for the tile. If lossy compression is used, then the accumulated error metric value for the tile is updated; in either event, the compressed pixel values are stored in the frame buffer for further processing. With this approach, the accumulated error caused by successive, or tandem, compression operations may be limited to a pre-determined maximum.

24 Claims, 4 Drawing Sheets

U.S. PATENT DOCUMENTS

| | | | |
|---|---|---|---|
| 6,326,964 B1 | 12/2001 | Snyder et al. | |
| 6,377,257 B1 | 4/2002 | Borrel et al. | |
| 6,389,088 B1 * | 5/2002 | Blois et al. | 375/355 |
| 6,504,954 B1 * | 1/2003 | Goldstein | 382/168 |
| 6,529,631 B1 * | 3/2003 | Peterson et al. | 382/232 |
| 6,603,470 B1 | 8/2003 | Deering | |
| 6,748,323 B2 | 6/2004 | Lokshin et al. | |
| 6,771,261 B2 * | 8/2004 | MacPherson | 345/420 |
| 6,825,847 B1 | 11/2004 | Molnar et al. | |
| 6,842,484 B2 * | 1/2005 | Gandhi et al. | 375/240.24 |
| 6,873,323 B1 | 3/2005 | Morein | |
| 7,126,615 B2 | 10/2006 | Liao | |
| 2003/0214502 A1 | 11/2003 | Park et al. | |
| 2003/0218606 A1 | 11/2003 | Zhirkov et al. | |
| 2004/0217956 A1 | 11/2004 | Besl et al. | |
| 2006/0023941 A1 | 2/2006 | Drebin et al. | |
| 2006/0188163 A1 | 8/2006 | Elder | |
| 2008/0247469 A1 * | 10/2008 | Vadapalli et al. | 375/240.27 |
| 2008/0247641 A1 * | 10/2008 | Rasmusson et al. | 382/166 |
| 2010/0060629 A1 * | 3/2010 | Rasmusson et al. | 345/419 |

OTHER PUBLICATIONS

Malvar, H. et al. "YCoCg-R: A Color Space with RGB Reversability and Low Dynamic Range." Joint Video Team (JVT) of ISO/IEC MPEG & ITU-T VCEG. JVT PExt Ad Hoc Group Meeting: Jul. 22-24, 2003, Trondheim.

Pereberin, A. "Hierarchical Approach for Texture Compression." Proceedings of GraphiCon '99, pp. 195-199. Available at: http://www.graphicon.ru/1999/Image%20Compression/Pereberin.pdf.

Weinberger, M. J. et al. "The LOCO-I Lossless Image Compression Algorithm: Principles and Standardization into JPEG-LS." IEEE Transactions on Image Processing, vol. 9, No. 5, pp. 1309-1324, Aug. 2006.

* cited by examiner

FRAME BUFFER COMPRESSION AND DECOMPRESSION METHOD FOR GRAPHICS RENDERING

RELATED APPLICATION

This application claims priority under 35 U.S.C. §119(e) from U.S. Provisional Patent Application Ser. No. 60/910,112, which was filed on 4 Apr. 2007 and is entitled "Color Buffer Compression and Decompression Method for Graphics Rendering."

BACKGROUND

The present invention generally relates to the processing of graphics data, and particularly relates to methods and apparatus for compressing frame buffer data in a three-dimensional (3D) graphics rendering system.

3D graphics rendering systems typically utilize several memory buffers during the rendering process, such as texture buffers, depth buffers (often called z-buffers), and color buffers. These buffers often are stored in random-access memory (RAM) external to the graphics processing unit (GPU), which may have relatively small cache memories on board. Because the buffered data may be retrieved and re-written several times during the rendering process, the memory bandwidth (the capacity for writing data to memory and reading data from memory) must often be quite high, especially to support real-time graphics processing applications such as real-time games. On a desktop personal computer, the available memory bandwidth might be very high, perhaps several gigabytes per second. In a mobile phone, several hundred megabytes per second of data transfer might be available.

Even with these high available memory bandwidths, the performance of a GPU might nonetheless be constrained by the memory bandwidth. Reducing the amount of data retrieved from and written to the external RAM is thus generally advantageous. The advantages of reducing memory transactions are particularly pronounced in mobile platforms, such as a mobile telephone, since the increased clock rates and wider data buses required to support very high memory bandwidths also result in increased power consumption, draining batteries more quickly.

Data compression is one approach to reducing the memory bandwidth required to support advanced 3D rendering applications. Lossless data compression techniques, which permit the reconstruction of the original data without any loss of information, are sometimes used today in 3D graphics rendering applications. Lossy data compression algorithms, which can provide significantly higher compression ratios but which may result in the introduction of visual artifacts in the reconstructed data, are commonly used in video applications, such as digital television, but appear to have been neglected with respect to compressing the color buffer in 3D rendering applications.

One reason for avoiding lossy compression schemes in 3D rendering applications is that it is possible to introduce large errors into the color buffer data when lossy compression is used several times. The need for repeated compression and decompression operations distinguishes many 3D graphics rendering applications from digital video applications, for instance, where a given frame is typically compressed just once. Some or all of the color buffer data for a single frame may be compressed and decompressed several times during the graphics rendering process. In a triangle-based 3D rendering system, for example, several triangles may be successively written to a segment (e.g., a tile, or block) of data. Each time, the segment of data may be retrieved from the frame buffer, decompressed, processed, compressed again, and written back to the color buffer. If lossy compression is used to compress the data segment each time, this tandem compression may result in repeated losses of information, introducing unacceptable errors into the final data.

SUMMARY

The methods and apparatus taught herein provide a novel approach to the processing of frame buffer data, e.g., color buffer data, in graphics processing applications. Although more generally applicable, these methods and apparatus are particularly useful in real-time, polygon-based, 3D rendering applications. Those skilled in the art will appreciate that the methods and apparatus disclosed herein may be applied to reduce the memory bandwidth requirements for a given graphics application, to facilitate more advanced graphics processing, or both. Those skilled in the art will also appreciate that the techniques disclosed herein may provide particular advantages in a battery-powered portable device, such as a mobile phone, where higher memory bandwidth requirements generally result in increased energy consumption and shorter battery life.

An exemplary method for processing graphics data according to one or more embodiments of the invention begins with the retrieval, from a buffer, of pixel values corresponding to a tile of two or more pixels, and with the updating of one or more of the retrieved pixel values. The updated pixel values are selectively compressed using a lossy compression operation or a lossless compression operation, based on an accumulated error metric value for the tile. If lossy compression is used, then the accumulated error metric value for the tile is updated; in either event, the compressed pixel values are stored in the frame buffer for further processing. With this approach, the accumulated error caused by successive, or tandem, compression operations may be limited to a pre-determined maximum.

In some embodiments, the effect of lossy compression on the accumulated error metric value for the tile is predicted before the compression operation is performed, and lossy compression or lossless compression is performed based on the predicted effect. In some of these embodiments, one of two or more lossy compression operations may be used, based on the predicted effect. In several embodiments, a lossless compression operation is used if the accumulated error metric value exceeds a pre-determined threshold; otherwise a lossy compression operation is used. In embodiments where the pixel values comprise pixel color values, the method may further comprise selecting the pre-determined threshold based on whether the updated pixel values comprise alpha values for alpha blending.

In some embodiments, the lossless compression operation comprises entropy encoding of residual errors from neighbor-based predictors of pixel values. Some of these embodiments may use Golomb-Rice coding. The lossy compression operation may comprise, in various embodiments, one or more of quantization, subsampling, or averaging of the updated pixel values. In embodiments where the pixel values comprise pixel color values, the lossy compression operation may comprise compressing luminance components of the pixel values using a lossless algorithm and compressing chrominance components of the pixel values using a lossy algorithm.

When the pixel values comprise pixel color values, various embodiments may further comprise transforming the pixel values from a first color space to a second color space before the pixel values are updated, and transforming the updated pixel values from the second color space to the first color space before compressing the updated pixel values. In several of these embodiments, the second color space comprises the red-green-blue (RGB) color space, and the first color space comprises a reversible, bit-exact transform of the first color space, such as the YCoCg color space.

Apparatus for processing graphics data according to one or more of the above methods, as well as variations of those methods, are also disclosed herein. Of course, the present invention is not limited to the above features and advantages. Those skilled in the art will recognize additional features and advantages upon reading the following detailed description, and upon viewing the accompanying drawings.

DETAILED DESCRIPTION

The various methods and devices disclosed herein describe a tile-based compression and decompression scheme for use in graphics processing, particularly in 3D graphics rendering applications. In much of the following discussion, the inventive techniques will be illustrated in the context of processing color buffer data, but those skilled in the art will appreciate the applicability of these techniques to other graphics data, such as texture buffer data, depth buffer data, or intensity data. Using the disclosed schemes, the quantity of graphics data that must be buffered may be reduced considerably, reducing the memory bandwidth required for storing and retrieving the graphics data, or freeing memory bandwidth for more advanced and/or more rapid graphics processing. As disclosed herein, lossy compression techniques may be used to achieve the largest compression gains, while lossless compression techniques are selectively applied to keep the accumulated errors introduced by the compression operations to acceptable levels.

Figure 1:
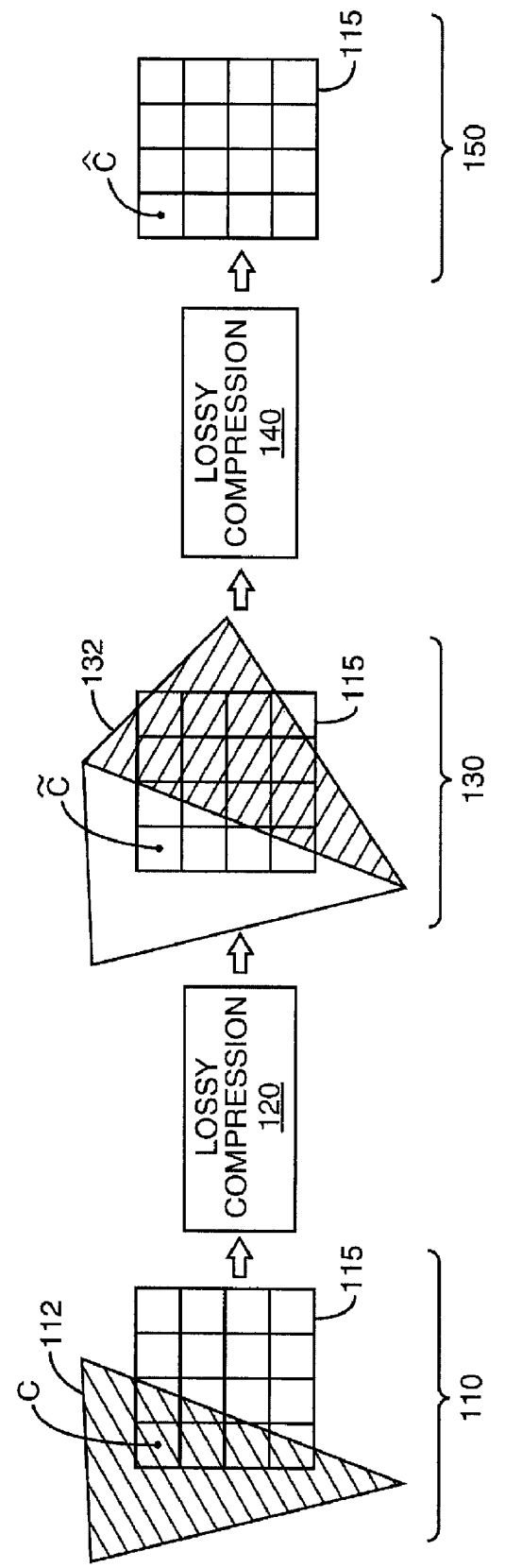
FIG. 1 illustrates the effects of tandem compression on pixel data.

As discussed above, applying lossy compression techniques to 3D graphics rendering contexts may introduce particular problems. Because 3D graphics data may be compressed and decompressed several times during the rendering of a single frame, the accumulated errors caused by repeated lossy compression operations may grow beyond acceptable levels, causing undesirable visual artifacts in the rendered image. This is illustrated in FIG. 1. At step 110, a first triangle 112 is written to a tile 115 of sixteen pixels. Specifically, a color value C is written to each of the pixels covered by triangle 112, including the pixel in the upper-left corner of tile 115. Subsequently, the color data for tile 115 is compressed, using a lossy compression operation, at step 120. This lossy compression introduces an error into the tile data, so that upon decompression (not shown), the upper-left pixel contains a value of $\tilde{C}$, not C. At step 130, triangle 132 is written to tile 115. In this example, the writing of triangle 132 has no direct effect on the color value associated with the upper-left pixel. However, after another compression operation at step 140, additional error is introduced to the color value for the upper-left pixel, so that the new value, at step 150, equals $\hat{\tilde{C}}$. Those skilled in the art will appreciated that the errors introduced by tandem compression, as illustrated in FIG. 1, may grow without bound under certain circumstances. However, using the techniques disclosed herein, lossy compression of graphics data may be applied, while still keeping the introduced errors under control.

Figure 2:
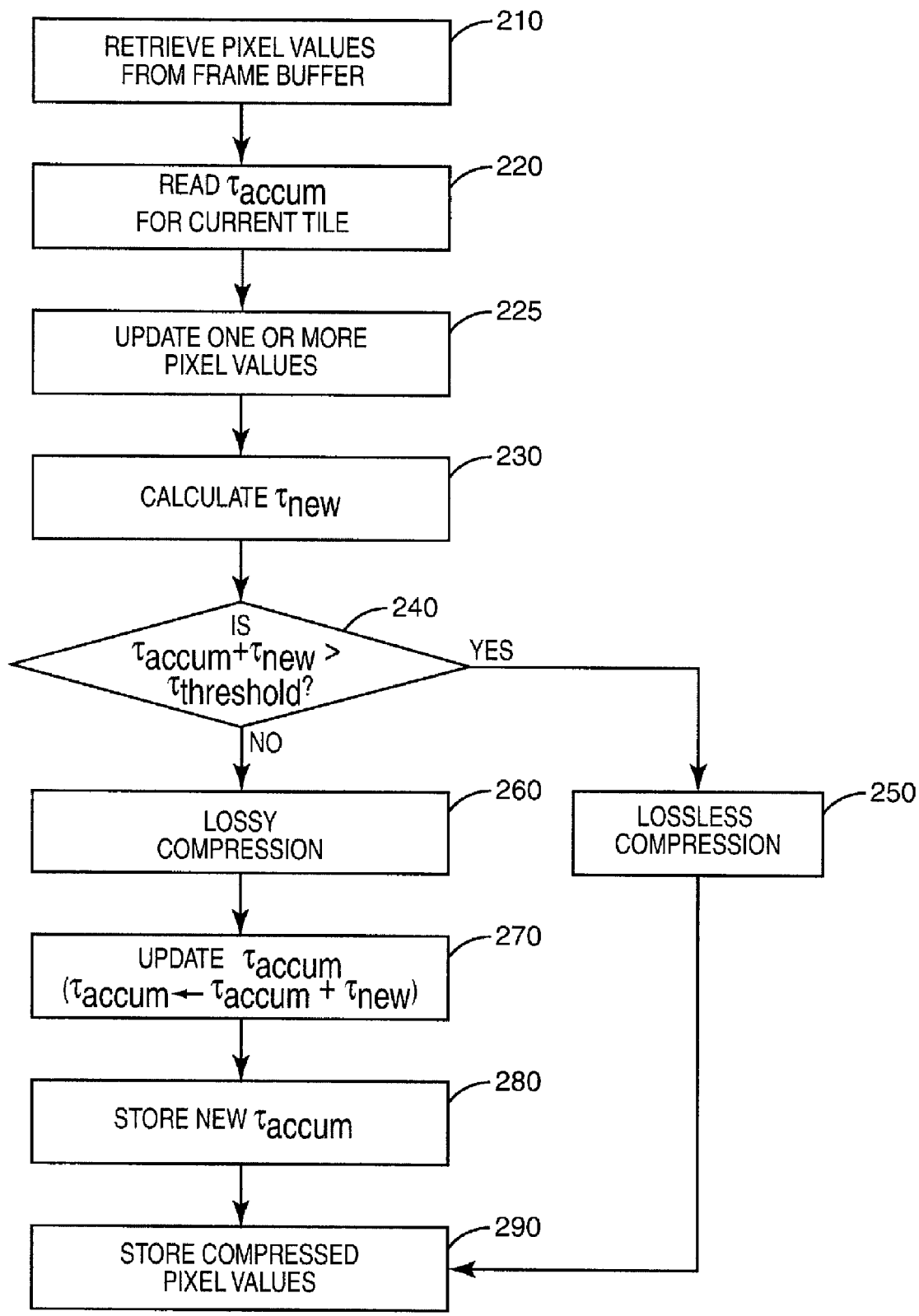
FIG. 2 is a flow diagram illustrating an exemplary method for processing graphics data according to one or more embodiments of the invention.

FIG. 2 illustrates an exemplary method for processing graphics data according to one or more embodiments of the present invention. At block 210, pixel values are retrieved from a frame buffer for processing. The term "frame buffer" is used herein to denote a memory structure for storing graphics data related to a given rendering of a graphics image. In some applications, the pixels of the frame buffer may directly correspond to the pixels of a video display device, so that the frame buffer comprises a complete frame of video data. In others, however, the frame buffer data may undergo additional processing before it is sent to a video display. In any event, the frame buffer typically comprises a color buffer, which includes a pixel color value for each pixel, and may also include a depth buffer, and a texture buffer. The color buffer data may also include alpha channel data used for alpha blending.

In the discussion that follows, the term "pixel" is used to describe a single element in a two-dimensional array of graphics data. Again, a single pixel of graphics data may or may not correspond to a single output pixel on a video display. Furthermore, those skilled in the art will be familiar with various graphics processing techniques that involve multisampling or supersampling of graphics data. Those practitioners will further appreciate that the inventive techniques described herein may be applied to supersampled or multi-sampled graphics data as well, for instance when that data must be repeatedly stored and retrieved from a buffer. Accordingly, the term "pixel", as used herein, may refer to each element of supersampled or multi-sampled graphics data.

At least for purposes of compression and decompression operations, the pixel data retrieved from the frame buffer is conveniently processed in blocks, or "tiles," comprising two or more pixel values. (The term "tile" is used herein to refer to a segment, or "block", of graphics data, comprising at least two pixel values.) For instance, the pixel data may be processed in eight-by-eight pixel tiles. Thus, each tile may be separately and independently compressed (and decompressed) according to the techniques described herein.

In various embodiments of the present invention, the process of retrieving pixel data from the frame buffer includes decompression of the pixel data before subsequent processing. As will be well understood by those skilled in the art, decompression involves reversing the operations used to compress the data. If a lossless scheme was employed to compress the data, then the original data may be reconstructed exactly, i.e., with no loss of information. On the other hand, if a lossy compression scheme was used, the corresponding decompression operation may restore the original data format and/or size, but some of the information in the original data is irretrievably lost.

In some embodiments of the present invention, the frame buffer includes or is associated with data indicating whether lossy or lossless compression was used. In several embodiments, each compressed tile is combined with header information before it is written to the frame buffer. In some of these embodiments, this data may include information indicating which of several compression algorithms was used. This data may be tile-specific, such that the use of lossy or lossless compression schemes may be independently signaled for each tile.

In a similar fashion, accumulated error information may be independently maintained for each tile. This accumulated error information thus includes an accumulated error metric value for each tile, the accumulated error metric value indicating the error introduced into the tile data from one or more lossy compression operations. The accumulated error metric values may be stored in the same memory as the frame buffer, or maintained in a separate memory. In a typical embodiment, the accumulated error metric values are initialized to zero at the beginning of a frame rendering operation, and updated after the use of one or more lossy compression operations on one or more of the tiles.

Thus, referring again to FIG. 2, an accumulated error metric value, $\tau_{accum}$, is retrieved from memory for a current tile to be processed, as shown at block 220. In some embodiments, $\tau_{accum}$ represents the accumulated mean square error for the tile, although other measures, such as the root mean square error, or the maximum error level for any of the pixels in the tile, may be used. Another useful error metric is the sum of absolute differences between the reconstructed pixel values and their "true" values. The choice of which error metric to use generally involves a trade-off between the number of bits needed to represent an error metric value and the precision of control that the error metric facilitates. Indeed, in some embodiments, more than one error metric may be used, to provide even finer control of the error introduced by tile compression, although the processing and storing of additional metric values may diminish the benefits gained from compressing the pixel data. In any event, the retrieved error metric value $\tau_{accum}$ indicates the error introduced thus far by previous lossy compression operations performed upon the current tile.

Once decompressed, the pixel data for the current tile is updated according to a current rendering operation, as shown at block 225. In a polygon-based 3D rendering application, for example, color values corresponding to a new triangle may be written to one or more of the pixels for the current tile. The rendered triangle may completely overlap the tile, so that all of the pixel values are updated, or may only partially cover the tile, so that one or several of the pixel values are updated while others remain unchanged. Other operations, such as shading, texturing, or alpha blending, may also be applied, according to techniques well known in the art.

Those skilled in the art will recognize that certain operations on a tile will make the corresponding accumulated error metric value obsolete. For example, if a triangle completely overlaps a tile, so that all the pixel color values for the tile are re-written, the accumulated error metric value resulting from previous compression operations is no longer applicable (assuming that the previous values are not blended with the new values). In these instances, then, the updating of the pixel values is followed by resetting the accumulated error metric value (or values) for the tile to zero. In other instances, such as when a rendered triangle only partly overlaps a tile, the accumulated error metric value continues to provide a meaningful indicator of the previously introduced compression errors.

In any event, after the pixel values are updated, the tile is compressed again, and stored back in the frame buffer to free up on-board RAM for processing of other tiles. Depending on the value of $\tau_{accum}$, however, further compression operations may be limited to lossless compression, so that $\tau_{accum}$ does not increase further. Accordingly, $\tau_{accum}$ may be compared to a threshold value $\tau_{threshold}$; if $\tau_{accum} > \tau_{threshold}$ then lossless compression is performed, to avoid introducing further error into the compressed data. On the other hand, if $\tau_{accum} \leq \tau_{threshold}$, at least one additional lossy compression operation may be tolerated.

In some embodiments, the effect of a projected lossy compression operation on the accumulated error metric value for the tile is predicted before determining whether to use the lossy compression operation or a lossless operation. Thus, at block 230, an error contribution $\tau_{new}$ is calculated, based on the projected lossy compression operation. At block 240, the accumulated error that would result from using the projected compression operation, e.g., the sum of $\tau_{accum}$ and $\tau_{new}$, is compared to a pre-determined threshold value $\tau_{threshold}$. If the projected lossy compression operation would result in the accumulated error metric value exceeding the threshold, then a lossless compression operation is performed instead, as shown at block 250, and the compressed pixel values are stored in (e.g., re-written to) the frame buffer at block 290. On the other hand, if the projected lossy compression operation will not introduce an unacceptable error level, then the lossy compression operation is performed, as shown at block 260.

In the event that the lossy compression operation is used, then the accumulated error metric value for the tile is updated, as shown at block 270. For instance, a previous accumulated error metric value may be replaced with a sum of the previous accumulated error metric value and the contribution from the newly performed compression operation. At block 280, the updated accumulated error metric value is stored for use in later processing of the tile, and the compressed tile is stored in the frame buffer at block 290.

Those skilled in the art will appreciate that the method illustrated in FIG. 2 may readily be extended to facilitate the selective application of several lossy compression algorithms. For instance, two different lossy compression algorithms may be available. One may offer greater compression than the other, at the expense of increased error introduction. If multiple lossy compression algorithms are available, then the error contribution calculation of block 230 may be performed first for the algorithm offering the highest compression. If the predicted total accumulated error does not exceed the threshold, then that algorithm is used at block 250. On the other hand, if the first algorithm would result in excessive error, then a predicted error contribution for the second algorithm is calculated and tested. If this algorithm results in an acceptable error level, then it is used. Otherwise, lossless compression is used, as in the previously discussed method.

In yet another variation, the accumulated error metric value is used to select one of two or more lossy compression algorithms. For instance, in one embodiment, if the accumulated error metric value is below a first threshold, then a first lossy compression algorithm is used. If the accumulated error metric value is above the first threshold, but below a second threshold, then a second lossy compression algorithm is used instead. Typically, the second compression algorithm is chosen to introduce less error than the first. If, on the other hand, the accumulated error metric value exceeds the second pre-determined threshold value, then lossless compression is used.

Those skilled in the art will appreciate that the method illustrated in FIG. 2 may be used with any lossless compression algorithm suitable for compression of block-organized pixel data, as well as with any suitable lossy compression algorithm. Those skilled in the art will appreciate, however, that when the techniques of the present invention are applied to color data, it may be advantageous to employ the compression algorithms in a luminance-chrominance color space, rather than the red-green-blue (RGB) color space used for many standard graphics processing processes. Accordingly, even if all or most pixel updating operations (such as the rendering of triangles, pixel shading, etc.) are performed in the RGB space, compression is advantageously performed upon pixel data that has been transformed to a luminance-chrominance space. As is well known in the art, more efficient compression is thus enabled, due to the decorrelation of the RGB channels.

Another advantage from using a luminance-chrominance color space for compressing pixel color data is that separate compression schemes may be used for the luminance and chrominance values. Since the human visual system is more susceptible to errors in the luminance components, some embodiments of the methods disclosed herein may always use lossless compression for the luminance components, while selectively employing lossy compression for the chrominance components according to the techniques disclosed herein. In other embodiments, lossy compression may selectively be permitted for both the luminance and chrominance components, but different schemes, with different threshold levels, employed to determine when to switch from lossy to lossless compression. In yet others, accumulated error metric values may be tracked separately for the luminance and chrominance components, and/or applied to separate thresholds, such that lossless compression is introduced sooner for luminance data than for chrominance data.

Several luminance-chrominance representations of pixel color data are known in the art. Because the present techniques employ at least one lossless compression scheme, so that compressed data may be reconstructed exactly, the color space transformation should also be exactly reversible. One such color transformation scheme is the RGB to $YC_OC_G$ (luminance plus offset orange plus offset green) transform introduced by Henrique Malvar and Gary Sullivan in their July 2003 contribution to the Joint Video Team of ISO/IEC PMEP & ITU-T VCEG, entitled "YCoCG-R: A Color Space with RGB Reversibility and Low Dynamic Range," Document No. JVT-I014r3. Using this approach, transforming from RGB to $YC_OC_G$ is done according to:

$$C_O = R - B$$

$$t = B + (C_O \gg 1)$$

$$C_G = G - t$$

$$Y = t + (C_G \gg 1) \quad (1)$$

and the corresponding transform from $YC_OC_G$ to RGB is:

$$t = Y - (C_G \gg 1)$$

$$G = C_G + t$$

$$B = t - (C_O \gg 1)$$

$$R = B + C_O \quad (2)$$

If the RGB components are stored using n bits each, the Y component will require n bits, and the chrominance components n+1 bits. Thus, transforming to the $YC_OC_G$ space may cost two additional bits. However, it has been shown that in certain contexts, color data transformed according to this approach may be compressed more efficiently than corresponding RGB data, or data transformed according to the commonly-used $YC_RC_B$ transform. (See Charles Poynton, *Digital Video and HDTV*, San Francisco: Morgan Kaufman Publishers, 2003, for a description of the $YC_RC_B$ transform.) It must be noted that the $YC_RC_B$ transform, is not, in general, reversible without information loss. An alternative color transform to $YC_OC_G$, however, is the exactly reversible component transformation (RCT) from the JPEG-2000 standard.

Suitable lossy compression algorithms may be quite simple. For example, pixel values may simply be quantized to a limited set of possible values, thus reducing the number of bits needed to store the values. This quantization process may simply involve truncation of the pixel values, in which case decompression simply requires the adding of zeroes to the truncated values to obtain full-precision data for subsequent processing. Alternatively, pixel values may be "rounded" before truncation. In other embodiments, pixel values may be subsampled. Thus, in one or more embodiments, a single value may be stored in the frame buffer to represent two or more pixel values. For example, a two-by-two sub-tile of four pixel values may be reduced to one value. The stored value may be selected from one of the four values, or may be an average of the four values. Those skilled in the art will recognize that various combinations of these schemes are also possible.

Lossless tile-based compression algorithms, since they must avoid the loss of any information in the compressed data, might be somewhat more complicated. In an exemplary embodiment, the lossless compression algorithm comprises entropy encoding of residual errors resulting from neighbor-based predictors of pixel values.

Figure 3:
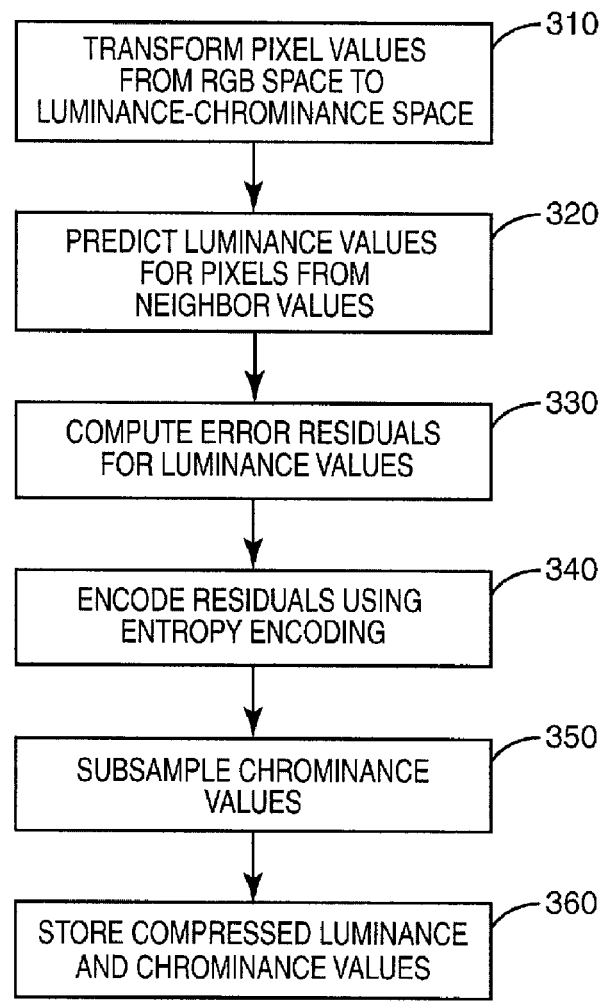
FIG. 3 is a flow diagram illustrating an exemplary method for compressing color buffer data.

Such a lossless compression algorithm is illustrated in the flowchart of FIG. 3. FIG. 3 begins with a transformation of pixel color values from the RGB space to a luminance-chrominance space, as illustrated at block 310. As was explained above, transforming pixel color data to a luminance-chrominance color space may offer several advantages, due to the decorrelation of the RGB data. Accordingly, the RGB data may be transformed in some embodiments to $YC_OC_G$ data, using Equation (1).

Figure 4:
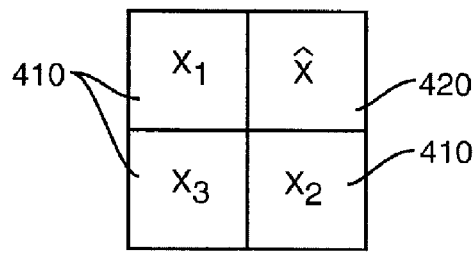
FIG. 4 illustrates the prediction of pixel data from neighbor pixels.

An exemplary approach to lossless compression of the luminance values for the current tile's pixels is illustrated at blocks 320, 330, and 340. First, luminance values for the pixels are predicted, using the values for neighboring pixels. One possible predictor was previously described in Weinberger, M. J, et al., *LOCO-I: A Low Complexity, Context-Based, Lossless Image Compression Algorithm*, in Data Compression Conference (1996), pp. 140-149, and is illustrated in FIG. 4, where luminance values $(x_1, x_2, x_3)$ for three neighbor pixels 410 are used to predict a luminance value $(\hat{x})$ for pixel 420. The luminance value $\hat{x}$ may be predicted according to Equation (3) below:

$$\hat{x} = \begin{cases} \min(x_1, x_2), & x_3 \geq \min(x_1, x_2) \\ \max(x_1, x_2), & x_3 \leq \min(x_1, x_2) \\ x_1 + x_2 - x_3, & \text{otherwise.} \end{cases} \quad (3)$$

Those skilled in the art will appreciate that the first two cases of Equation (3) perform simple (and limited) edge detection, in which case the color value is predicted based on just one of the neighbors. In the illustrated approach, for pixels along the lower and left edge of a tile, only one neighbor value is accessible. In each of these cases, the color of the single neighbor is used as the predicted value for the subject pixel. A value of zero is used to "predict" the lower-left pixel color value. This results in a first error residual, for the lower-left pixel, that equals the pixel's actual value.

Referring again to FIG. 3, error residuals for each of the pixels are computed, at block 330, by subtracting the predictor value for each pixel from the pixel's current value. The residuals are generally of small magnitude, with occasional (but infrequent) large values. These latter values are typically found for discontinuity edges, or where the behavior of this simple predictor is not well-suited to the structure of the image.

The residuals are then encoded at block 340, using an entropy encoding algorithm, to minimize the number of bits needed to store the residual values. In one embodiment, a Golomb-Rice coder is used. (Rice, R. F., *Some Practical Universal Noiseless Coding Techniques*, Tech. Rep. 22, Jet Propulsion Lab, 1979.) Golomb-Rice begins with dividing a residual value, $\epsilon = x - \hat{x}$, by a constant $2^k$. The result is a quotient q and a remainder r. The quotient q is stored using unary coding, while the remainder r is stored using normal binary coding with k bits. Because the Golomb-Rice compressor works only with positive numbers, negative residual values are first converted to positive values using an "overlap and interleave" remapping method where a negative number n is remapped to $2 \cdot |n| - 1$, while a positive number m is remapped to $2 \cdot m$. That is, negative numbers are mapped to new odd numbers and positive numbers are mapped to new even numbers. For example, the negative number $-3$ is mapped to $2 \cdot 3 - 1 = 5$, and the positive number 3 is mapped to $2 \cdot 3 = 6$.

To illustrate with an example, assume that the values $-3, 0, 9$, and 1 are to be encoded, and further assume that $k=2$. The values are first transformed to eliminate negative values, resulting in the transformed values 5, 0, 18, and 2. The division step results in four (q, r) pairs: (1,1), (0,0), (4,2), and (0,2). Unary coding of the quotient q results in a series of q ones followed by a terminating zero. The encoded values in our example thus become $(10_u, 01_b)$, $(0_u, 00_b)$, $(11110_u, 10_b)$, and $(0_u, 10_b)$, for a total of 17 bits. This compares to 20 bits required to encode the same data as signed binary values.

An optimal value for k may be selected for each two-by-two sub-tile using an exhaustive search. In addition, the special case where q is zero for all sub-tile values may be tested for. In this special case, the terminating zero bit may be removed from the encoded values. The value of k is stored along with each tile for use in reconstructing the compressed data. In some embodiments, the range of potential values for k may be limited to a pre-determined range of values. For example, empirical testing of this algorithm has revealed that k is often relatively evenly distributed in the range [0,6]. Furthermore, the special case (where q is zero for all pixels in a sub-tile) is most often encountered when the entire sub-tile consists only of zero values. Thus, in one or more embodiments, the value of k may be encoded as a 3-bit header for each sub-tile, wherein the 3 bits comprise the value of k unless the 3 bits are all ones (representing a value of seven), which indicates that the entire sub-tile is equal to zero and that no more data for that sub-tile follows. In other cases, the header is followed by the Golomb-Rice encoded residuals.

Referring once more to FIG. 3, the chrominance components of the pixel values are compressed at block 350, and the compressed luminance and chrominance components stored in the color buffer at block 360. As noted above, any of several compression methods may be used to compress the chrominance components. In the method illustrated in FIG. 3, sub-sampling is used. However, truncation, quantization, and/or simple averaging may also be used.

In view of the previously illustrated methods, those skilled in the art will appreciate that the techniques described herein may be used in various combinations, to achieve a desired balance between compression performance and acceptable errors. For instance, FIG. 3 illustrates the application of lossless compression to luminance values of a color buffer. Those skilled in the art will appreciate that the same, or similar, lossless compression algorithm may be applied to chrominance values when a maximum acceptable error threshold has been reached. Similarly, those skilled in the art will appreciate that the lossy compression techniques discussed above may be applied, in some embodiments, to luminance components of pixel color data as well as chrominance components, until a threshold error level is reached.

Furthermore, although the lossless and lossy compression techniques were illustrated above with respect to luminance-chrominance color space data, the same or similar techniques may be applied to RGB color data, as well as color data transformed to another color space, although the compression efficiency may suffer. Finally, the compression techniques discussed herein are applicable to other types of graphics data in addition to color buffer data, such as texture buffer data, or depth-buffer data. Those skilled in the art will appreciate that different thresholds, or different error metrics altogether, may be applied depending on the graphics data type. In some embodiments, one portion of the graphics data may have a different characteristic than another portion; in these embodiments, one of several different threshold values may be selected for use with a given tile, depending on that characteristic. For instance, some data might include or correspond to alpha values for alpha blending; one pre-determined threshold value might be selected for use with those tiles for which alpha blending is employed, while another threshold value is selected for use with those tiles where alpha blending is not employed.

Figure 5:
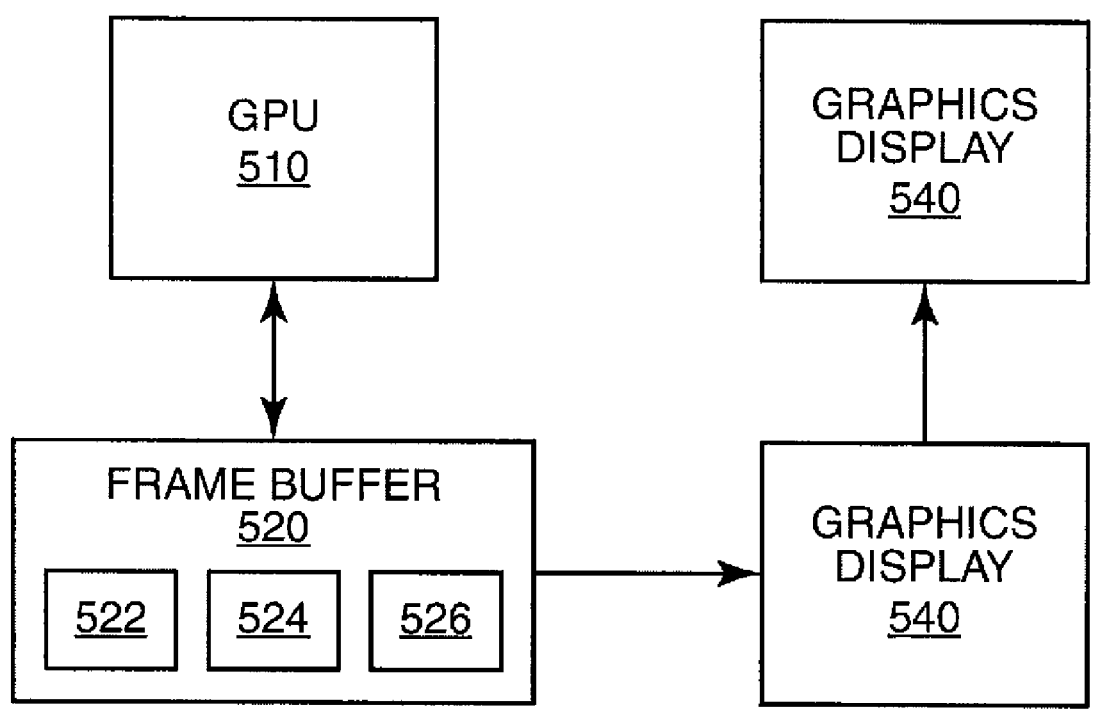
FIG. 5 is a block diagram of an apparatus for processing graphics data according to one or more embodiments of the invention.

With the above range of variations and applications in mind, an exemplary processing circuit for processing graphics data is illustrated in FIG. 5. The processing circuit includes a graphics processing unit (GPU) 510 and a frame buffer 520. GPU 510 may be a dedicated graphics rendering device for a personal computer, workstation, game console, mobile phone, or the like, or may be a general purpose processing system programmed to performed graphics processing operations. GPU 510 may comprise one or more microprocessors, microcontrollers, digital signal processors, and/or customized hardware, and may be implemented as a standalone chip or as part of an application-specific integrated circuit (ASIC) that includes other functions. In many embodiments, GPU 510 comprises on-board random access memory and/or cache memory.

Frame buffer 520 comprises a memory structure for storing graphics data for at least one frame of a graphical image. In the graphics processing circuit of FIG. 5, frame buffer 520 comprises three or more buffers, a color buffer 522, which includes color data for each of a number of pixels, a depth buffer 524, comprising depth data for each pixel, and texture buffer 526. In some embodiments, frame buffer 520 may comprise additional buffers, such as a stencil buffer. Frame buffer 520 is typically implemented using fast random access memory (RAM), such as static RAM (SRAM), although other memory types, such as DRAM, flash, etc., are possible. All or part of frame buffer 520 may be implemented with one or more separate memory circuits or chips, or may be implemented as part of an ASIC that may also include all or a portion of GPU 510.

GPU 510 is programmed, using software, firmware, or some combination of the two, and/or hardwired to carry out one or more of the methods described herein. Thus, GPU 510 is programmed, in some embodiments, to process graphics data by: retrieving pixel values from frame buffer 520, the pixel values corresponding to a tile of two or more pixels; updating one or more of the pixel values to obtain updated pixel values; selectively compressing the updated pixel values using a lossy compression operation or a lossless compression operation, based on an accumulated error metric value for the tile; updating the accumulated error metric value if lossy compression is used; and storing the compressed pixel values in frame buffer 520. Those skilled in the art will appreciate that one or more of the operations of GPU 510 may be performed by hardwired circuits while others are performed by one or more programmable processor elements.

Graphics data stored in frame buffer 520 in compressed form must be decompressed before it is displayed to the user. In some embodiments, this decompression operation, typically performed after a frame has been completely rendered, may be performed by GPU 510. However, it may be advantageous in some applications to perform color buffer decompression in a display controller, or in a hardware processing block prior to the display controller. Thus, FIG. 5 further illustrates a display driver 530, and a graphics display 540. In one or more embodiments of the invention, the display driver 530 is configured to retrieve the stored, compressed pixel values from frame buffer 520, to decompress the retrieved pixel values, to transform the updated pixel values from the first color space to the RGB color space, and to provide the transformed, updated pixel values to the display 540.

In some embodiments, display driver 530 is implemented with hardware closely associated with graphics display 540; for example, many mobile phones already include a display processing block providing features such as scaling, overlay, color depth transformation, and the like. Color buffer decompression (and color space transformation, if needed) may be performed in such a display processing block. Alternatively, the functions of display driver 530 may be performed by the same circuit or circuits used to perform the functions of GPU 510.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method for processing graphics data, comprising:
   retrieving, from a frame buffer, pixel values corresponding to a tile of two or more pixels;
   updating, by a graphics processor, one or more of the pixel values to obtain updated pixel values;
   selectively compressing the updated pixel values, by the graphics processor using a lossy compression operation or a lossless compression operation, based on an accumulated error metric value for the tile;
   updating the accumulated error metric value if lossy compression is used; and
   storing the compressed pixel values in the frame buffer.

2. The method of claim 1, wherein selectively compressing the updated pixel values comprises predicting the effect of the lossy compression on the accumulated error metric value, and using the lossy compression operation or the lossless compression operation based on the predicted effect.

3. The method of claim 1, wherein selectively compressing the updated pixel values comprises predicting the effects of two or more lossy compression operations on the accumulated error metric value and selecting the lossless compression operation or one of the two or more lossy compression operations, based on the predicted effect.

4. The method of claim 1, wherein selectively compressing the updated pixel values comprises using the lossless compression operation if the accumulated error metric value exceeds a pre-determined threshold and otherwise using the lossy compression operation.

5. The method of claim 4, wherein otherwise using the lossy compression operation comprises selecting the lossy compression operation from two or more candidate lossy compression operations based on the accumulated error metric value.

6. The method of claim 4, wherein the pixel values comprise pixel color values, and wherein the method further comprises selecting the pre-determined threshold based on whether the updated pixel values comprise alpha values.

7. The method of claim 1, wherein the lossless compression operation comprises entropy encoding of residual errors from neighbor-based predictors of pixel values.

8. The method of claim 7, wherein entropy encoding of residual errors comprises Golomb-Rice coding.

9. The method of claim 1, wherein the lossy compression operation comprises one or more of quantization, subsampling, or averaging of the updated pixel values.

10. The method of claim 1, wherein the pixel values comprise pixel color values and wherein the lossy compression operation comprises compressing luminance components of the updated pixel values using a lossless algorithm and compressing chrominance components of the updated pixel values using a lossy algorithm.

11. The method of claim 10, wherein the lossless algorithm comprises Golomb-Rice encoding of residual errors from neighbor-based predictors of luminance values for the updated pixel values, and wherein the lossy algorithm comprises one or more of quantization, subsampling, or averaging of the chrominance components of the updated pixel values.

12. The method of claim 1, wherein the pixel values comprise pixel color values and wherein the method further comprises transforming the pixel values from a first color space to a second color space before updating one or more of the pixel values and transforming the updated pixel values from the second color space to the first color space before selectively compressing the updated pixel values.

13. The method of claim 12, wherein the second color space comprises the RGB color space and wherein the first color space comprises a reversible, bit-exact transform of the first color space.

14. The method of claim 13, wherein the first color space comprises the YCoCg color space.

15. An apparatus for processing graphics data, comprising a frame buffer and
   a graphics processor configured to:
      retrieve, from the frame buffer, pixel values corresponding to a tile of two or more pixels;
      update one or more of the pixel values to obtain updated pixel values;
      selectively compress the updated pixel values using a lossy compression operation or a lossless compression operation, based on an accumulated error metric value for the tile;
      update the accumulated error metric value if lossy compression is used; and
      store the compressed pixel values in the frame buffer.

16. The apparatus of claim 15, wherein the graphics processor is configured to selectively compress the updated pixel values by predicting the effect of the lossy compression on the accumulated error metric value and using the lossy compression operation or the lossless compression operation based on the predicted effect.

17. The apparatus of claim 15, wherein the graphics processor is configured to selectively compress the updated pixel values by predicting the effects of two or more lossy compression operations on the accumulated error metric value and selecting the lossless compression operation or one of the two or more lossy compression operations, based on the predicted effects.

18. The apparatus of claim 15, wherein the graphics processor is configured to compress the updated pixel values using the lossless compression operation if the accumulated error metric value exceeds a pre-determined threshold and using the lossy compression operation otherwise.

19. The apparatus of claim 18, wherein the graphics processor is further configured to select the lossy compression operation from two or more candidate lossy compression operations based on the accumulated error metric value if the accumulated error metric value does not exceed the pre-determined threshold.

20. The apparatus of claim 18, wherein the pixel values comprise pixel color values and wherein the graphics processor is further configured to select the pre-determined threshold based on whether the updated pixel values comprise alpha values.

21. The apparatus of claim 15, wherein the pixel values comprise pixel color values and wherein the lossy compression operation comprises compressing luminance components of the updated pixel values using a lossless algorithm and compressing chrominance components of the updated pixel values using a lossy algorithm.

22. The apparatus of claim 15, wherein the pixel values comprise pixel color values and wherein the graphics processor is further configured to transform the pixel values from a first color space to a second color space before updating one or more of the pixel values and to transform the updated pixel values from the second color space to the first color space before selectively compressing the updated pixel values.

23. The apparatus of claim 22, wherein the second color space comprises the RGB color space and wherein the first color space comprises a reversible, bit-exact transform of the first color space.

24. The apparatus of claim 23, further comprising a display and a display driver, wherein the display driver is configured to:
retrieve the stored, compressed, updated pixel values from the frame buffer;
decompress the retrieved, compressed updated pixel values;
transform the updated pixel values from the first color space to the RGB color space; and
provide the transformed, updated pixel values to the display.

\* \* \* \* \*